(12) United States Patent
Poornachandran et al.

(10) Patent No.: US 9,230,139 B2
(45) Date of Patent: Jan. 5, 2016

(54) SELECTIVE CONTENT SHARING ON COMPUTING DEVICES

(71) Applicant: Intel Corporation, Santa Clara, CA (US)

(72) Inventors: Rajesh Poornachandran, Portland, OR (US); Karthik Veeramani, Hillsboro, OR (US); Mamatha Balguri, Hillsboro, OR (US); James A Bish, Antelope, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/803,829

(22) Filed: Mar. 14, 2013

(65) Prior Publication Data

US 2014/0283087 A1  Sep. 18, 2014

(51) Int. Cl.
*G06F 21/00* (2013.01)
*G06F 21/84* (2013.01)
*G06F 21/62* (2013.01)
*G06F 21/60* (2013.01)
*H04L 29/06* (2006.01)
*H04L 12/18* (2006.01)

(52) U.S. Cl.
CPC .............. *G06F 21/84* (2013.01); *G06F 21/6245* (2013.01); *G06F 21/606* (2013.01); *H04L 12/1813* (2013.01); *H04L 65/403* (2013.01)

(58) Field of Classification Search
CPC ............ G06F 17/30165; G06F 3/1454; G06F 21/606; H04L 12/1813; H04L 65/403
USPC ........................................................... 726/26
See application file for complete search history.

(56) References Cited

U.S. PATENT DOCUMENTS

| | | | | |
|---|---|---|---|---|
| 6,151,020 | A * | 11/2000 | Palmer et al. | 715/733 |
| 7,685,238 | B2 * | 3/2010 | Etelapera | 709/205 |
| 7,725,739 | B2 * | 5/2010 | Lelikov | 713/193 |
| 8,261,361 | B2 * | 9/2012 | Liu et al. | 726/27 |
| 2004/0024819 | A1 * | 2/2004 | Sasaki et al. | 709/205 |
| 2007/0265023 | A1 * | 11/2007 | Bengtsson et al. | 455/466 |
| 2009/0213205 | A1 * | 8/2009 | Ivashin et al. | 348/14.08 |
| 2012/0036218 | A1 * | 2/2012 | Oh et al. | 709/217 |
| 2012/0324589 | A1 * | 12/2012 | Nukala et al. | 726/28 |
| 2013/0019186 | A1 * | 1/2013 | Lance et al. | 715/753 |
| 2013/0194374 | A1 * | 8/2013 | Kieft et al. | 348/14.07 |
| 2013/0227014 | A1 * | 8/2013 | Song | 709/204 |
| 2013/0236125 | A1 * | 9/2013 | Kim | 382/305 |

\* cited by examiner

*Primary Examiner* — Hadi Armouche
*Assistant Examiner* — Bryan Wright
(74) *Attorney, Agent, or Firm* — Forefront IP Lawgroup, PLLC

(57) ABSTRACT

Described herein are architectures, platforms and methods for selective content sharing feature between computing devices, and particularly, a system that supports user configurable application-level privacy for selective content sharing between computing devices.

21 Claims, 6 Drawing Sheets

SELECTIVE CONTENT SHARING ON COMPUTING DEVICES

BACKGROUND

A typical multi-monitor solution involves a host device displaying content such as multimedia, software application, etc. on a remote display through a wired or wireless link. Many hosts support a mode that clones or mirrors the content of a local display to the remote display. In other words, whatever content that appears in the local display will also be rendered in the remote display. These contents that are rendered to a host frame buffer are sent to the remote display, regardless of the sensitivity of the application (software application) that renders the content.

One of the major challenges in the multi-monitor display configuration is the lack of support for application-level privacy to allow a user to share selective content being rendered on the primary display with the secondary display. This is especially true if the secondary display is used in clone/mirror mode or if the secondary display is acting as the primary display (e.g., PC is connected to a projector; however, the PC display is turned off and projector is used as the primary display).

Therefore, it is a challenge to provide solutions that supports application-level privacy in selective content sharing of computing devices.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for selective content sharing feature in a computing device and more particularly, a system that supports software or firmware application-level privacy is described. For example, the application-level privacy is implemented for selective content sharing between computing devices. In this example, the selective content sharing is implemented either through an application privacy setting or through a privacy seeking application.

In an implementation, the application privacy setting in a computing device utilizes user interaction to implement the selective content sharing of an application from a primary computing device to a rendering computing device. For example, the primary computing device receives a user instruction and initiates the running of the application privacy setting. In this example, the primary computing device loads one or more applications that may be configured to become a sensitive application or a non-sensitive application depending upon whether the user elect to enable the corresponding private policy setting of the one or more applications.

Upon configuration, the sensitive applications and non-sensitive applications will be displayed in a local display of the primary computing device and in a remote display of the rendering computing device, respectively. In an implementation, newly invoked applications or new applications that are currently running in the primary computing device will not be rendered in the remote display unless the newly invoked applications or currently running new applications are configured by the user to be non-sensitive applications.

In an implementation, the privacy seeking application requires no user interaction since the privacy seeking application is configured to run by itself when a system is turned ON. For example, the privacy seeking application pre-configures which application or applications are sensitive or non-sensitive applications. In this example, there is no need for the user interaction to enable or disable the private policy settings of the application or applications.

In other implementations, the privacy seeking application may be cloud based such that, the user may log in and register the computing devices that may include the selective content sharing features. For example, if a particular device is registered as a rendering computing device, then upon turning ON of the rendering computing device, the configured non-sensitive applications from the primary computing device may be displayed right away. In another example, the privacy seeking application may base its configuration from a detected link connection between the primary computing device and the rendering computing device. For example, if the detected link connection is a wireless link connection, then privacy seeking application is configured to transform application or applications to become sensitive or non-sensitive applications.

Figure 1:
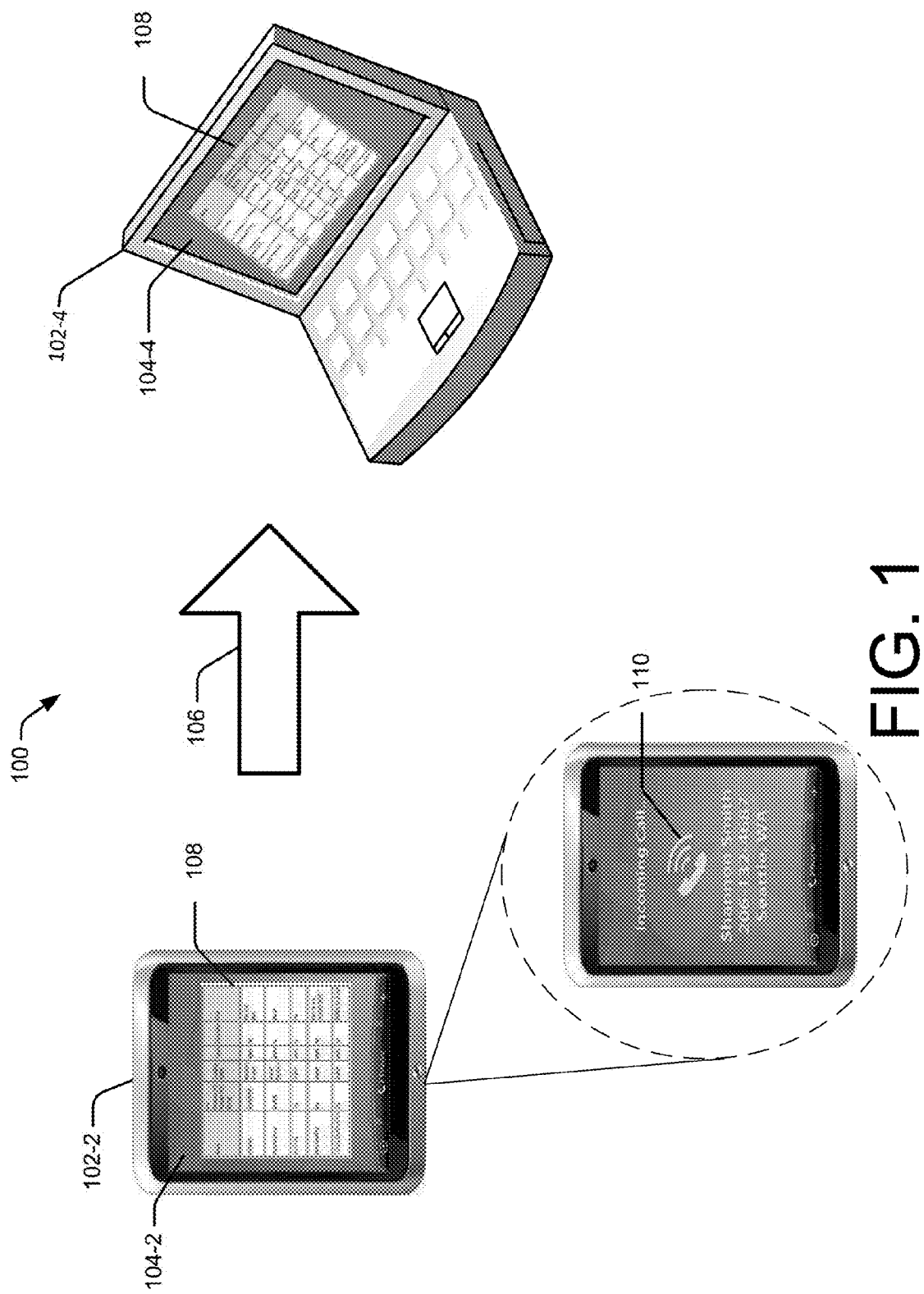
FIG. 1 is an example scenario that illustrates a privacy management for selective content sharing in a computing device.

FIG. 1 is an example scenario 100 that illustrates privacy management for selective content sharing in mobile devices. Scenario 100 includes a (primary) computing device 102-2 with a local display 104-2, and a (rendering) computing device 102-4 with a remote display 104-4. The computing devices 102 are connected through a link 106.

As an example of present implementation herein, the computing devices 102 may include, but are not limited to, desktop computers, Ultrabooks, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. Although FIG. 1 shows a single pair that illustrates selective content sharing between the computing device 102-2 and the computing device 102-4, in reality, multiple rendering devices (i.e., computing device 102-4) may display the selected and shared contents, applications, or graphics from the computing device 102-2. The selected and shared contents, applications, or graphics from the computing device 102-2 may be classified as non-sensitive applications while the non-selected contents and un-shared, applications, or graphics may be classified as sensitive applications.

In an implementation, the non-sensitive applications are transmitted for display in the remote display 104-4, while the sensitive applications are utilized for private consumption in the local display 104-2.

As an example of present implementations herein, the selective content sharing between the computing devices 102 may be implemented through an application privacy setting or through a privacy seeking application.

In an implementation, the application privacy setting is an automated function that utilizes user interaction to initiate the selective content sharing. For example, the user may scroll through multiple applications that are currently running on the computing device 102-2 and enable or disable corresponding private policy settings for these applications. FIG. 1 shows, for example, sharing of a graphical table 108 by the computing device 102-2 to the rendering computing device 102-4. In this example, the computing device 102-2 is a source of the graphical table 108 while the computing device 102-4 is utilized as a clone or extended monitor for the computing device 102-2.

During the rendition of the graphical table 108 in the computing device 102-4, a newly invoked application or a new application that will be running in the computing device 102-2 will not affect this current configuration of rendering the graphical table 108 in the computing device 102-4. For example, when an incoming call 110 is received by the computing device 102-2 during the rendition of the graphical table 108, the incoming call 110 can be seen at the local display 104-2; however, the incoming call 110 is not rendered at the remote display 104-4. In other words, the remote display 104-4 still renders the graphical table 108 as originally configured and the incoming call 110 will not be shown at the remote display 104-4.

In an implementation, the privacy seeking application—as another mode of implementing application-level privacy between the computing devices 102—performs an automated function that configures the computing device 102-2 during the privacy seeking application loading or installation. For example, the privacy seeking application pre-configures which application or applications are sensitive or non-sensitive applications. In this example, the user interaction is not required to initiate the running of the privacy seeking application.

As an example present implementation herein, the privacy seeking application is configured to detect and utilize a type of link connection (i.e., link 106) between computing devices 102 during system start up. For example, if the rendering computing device 102-4 is connected through a wired link (e.g., high-definition multimedia interface (HDMI) connection) to the computing device 102-2, then the privacy seeking application pre-configures certain applications to be sensitive or non-sensitive applications. In another example, if the privacy seeking application detects a wireless link 106 that utilizes near field communications (NFC) signals, BlueTooth™ signals, cellular signals, or wireless fidelity (Wi-Fi) signals, then the privacy seeking application may pre-configure a different set of applications as compared to wired link above.

In another implementation, for cloud-based privacy seeking application, the user may log in to the privacy seeking application and register which computing device 102 will include the selective content sharing feature. Furthermore, for the computing device 102 that will have the selective content sharing feature, the user, for example, may configure which application or applications will be sensitive or non-sensitive applications.

Figure 2:
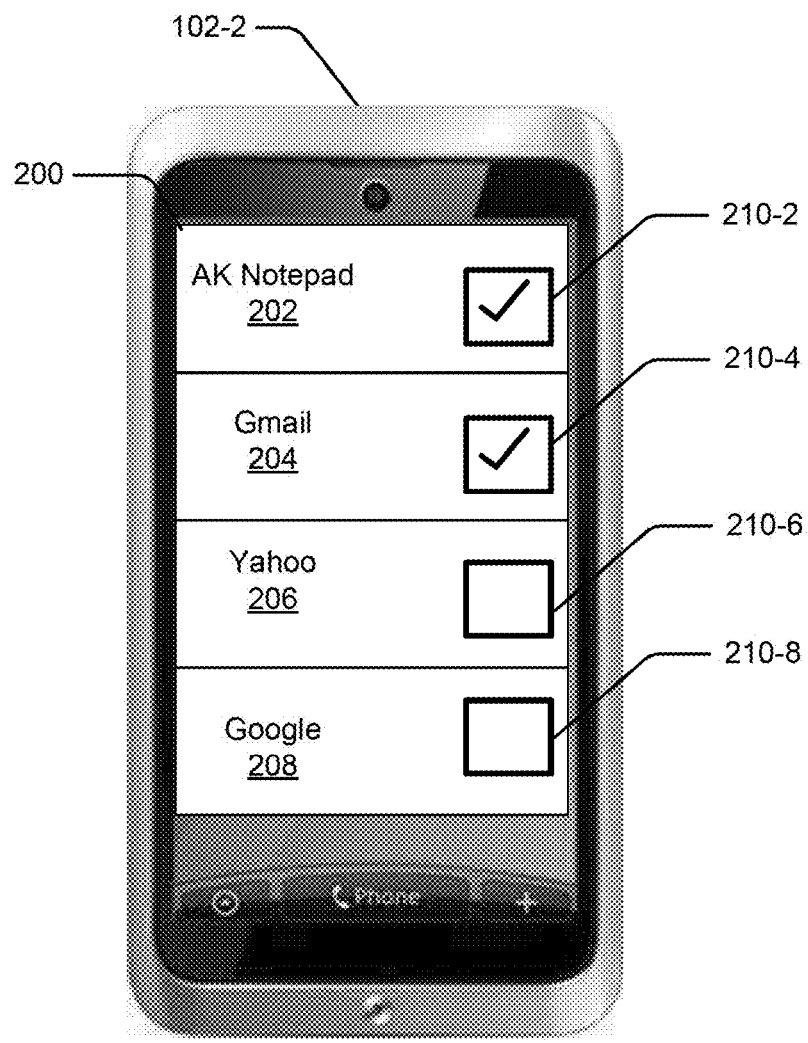
FIG. 2 is an example implementation of utilizing an application privacy setting for selective content sharing in a computing device.

FIG. 2 illustrates an example implementation of utilizing an application privacy setting for selective content sharing in the computing device 102-2.

In an implementation, a user may open the application privacy setting for the computing device 102-2 and views a manifest file 200 that includes applications such as, for example, AK Notepad 202, Gmail 204, Yahoo 206 and Google 208. In this implementation, the user may enable private policy settings that are associated with these applications in the manifest file 200. For example, as shown in FIG. 2, the AK notepad 202 and the Gmail 204 are enabled for exclusive rendering in the computing device 102-2. In this example, the enabling of the private policy settings may be shown by check tags 210-2 and 210-4. Although FIG. 2 shows four applications in the manifest file 200, in reality, multiple files may be included in the manifest file 200 for selective sharing contents with the rendering computing device.

With continuing reference to FIG. 2, the Yahoo 206 and Google 208 are not enabled as shown by check tags 210-6 and 210-8 and as such, these applications will be displayed in the rendering computing device.

In an implementation, the enabling or disabling of the private policy settings for the applications in the manifest file 200 may be toggled as the user may desire. For example, if the user wants to enable the Yahoo 206 and disable exclusive rendering of the Gmail 204 in the local display 102-2, then the user may open the application privacy setting of the computing device 102-2 and perform this toggling of the private policy settings of the applications.

Figure 3:
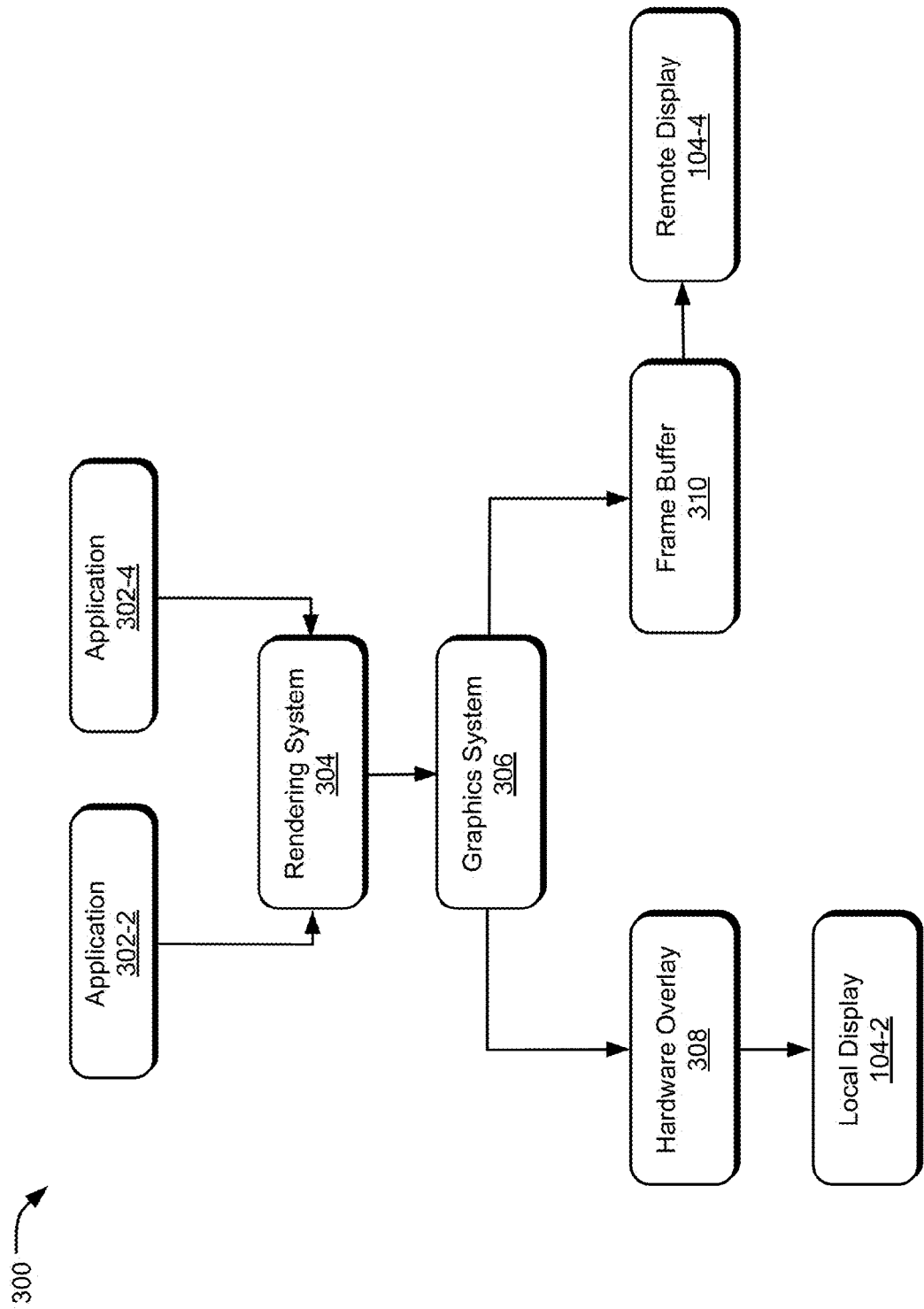
FIG. 3 is a diagram of an example system that supports application-level privacy for selective content sharing feature in a computing device.

FIG. 3 shows an example system 300 that supports application-level privacy for selective content sharing feature in a computing device. System 300 may be an Android™ based system. For example, the application-level privacy is implemented through the privacy seeking application or the application privacy setting that utilizes user interaction. The system 300 includes applications 302 (software applications), a rendering system 304, a graphics system 306, a hardware overlay 308, a frame buffer 310, and the local display 104-2. The remote display 104-4 is shown for purposes of illustrating the current implementation.

As an example of present implementations herein, the applications 302 are software applications designed to run in the computing device 102-2. For example, the applications 302 include, but not limited to, send and receive mobile calls, instant messaging, mobile games, location tracking (i.e., GPS), email, calendar, contacts, word processing applications, etc. In this example, the applications 302 may be loaded and classified by a processor (not shown) as a sensitive application or a non-sensitive application. In other words, the processor may run privacy seeking application or the application privacy setting and configures the loaded applications for selective content sharing to the rendering computing device.

In an implementation, the rendering system 304, also known as a "surface flinger", is configured to receive the applications 302 and determine a resulting frame to be displayed. In other words, the rendering system 304 determines picture content (e.g., frames) that will appear in the local display 104-2 and the remote display 104-4. For example, the resulting frame is a composite frame of the sensitive and non-sensitive applications 302. In this example, the rendering system 304 is configured to distinguish the resulting frame for the sensitive applications versus the non-sensitive applications 302.

After determination of this resulting frame configuration, the rendering system 304 communicates the resulting frame to be displayed in the local display 104-2 or the remote display 104-4 via the hardware overlay 308 or the frame buffer 310, respectively.

As an example of current implementation herein, the graphics systems 306, also known as a "hardware composer", is configured to receive the resulting frames and determines the corresponding buffers for the resulting frames. For example, the graphics systems 306 is configured to identify the resulting frames for sensitive applications 302 and communicates the identified resulting frames to the corresponding hardware overlay 308. In another example, the graphics systems 306 is configured to identify the resulting frames for non-sensitive applications 302 and communicates the identified resulting frames to the corresponding frame buffer 310.

As an example of current implementation herein, the resulting frames for the sensitive application 302 will be rendered by the local display 104-2 while the resulting frames for the non-sensitive application 302 will be rendered by both local display 104-2 and the remote display 104-4.

As an example of current implementation herein, the hardware overlay 308 and the frame buffer 310 are stored in separate memories (not shown) in order to protect, for example, the tampering of applications 302 that are configured for private consumption in the local display 104-2. For example, if the application 302-2 contains an enabled private policy setting (i.e., sensitive), then the application 302-2 will be displayed for private consumption in the local display 104-2. In this example, the remote display 102-4 will not be able to tamper, capture or display the application 302-2. Therefore, frames rendered via the hardware overlay 308 cannot be captured by software to be sent to remote display 104-4.

Figure 4:
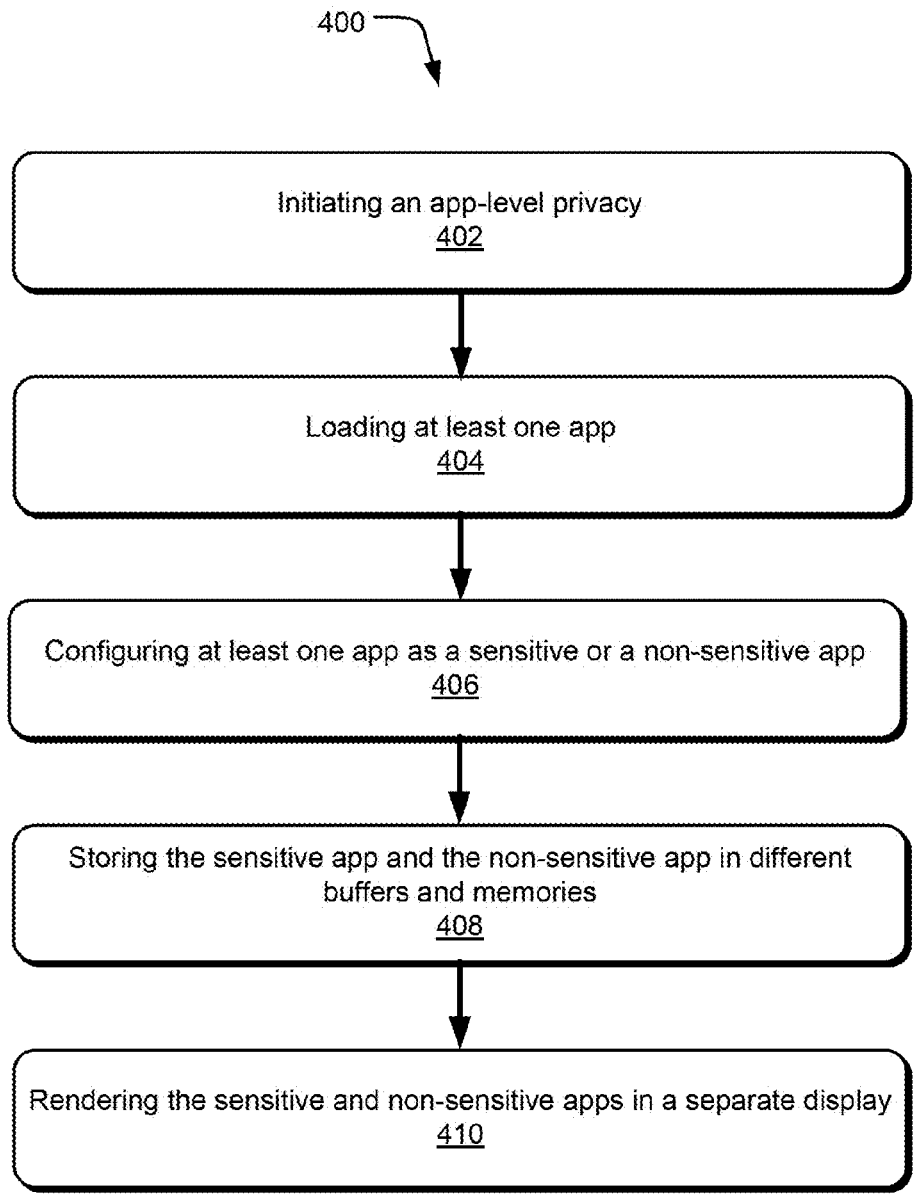
FIG. 4 shows an example process flowchart illustrating an example method for selective content sharing that supports application-level privacy.

FIG. 4 shows an example process flowchart 400 illustrating an example method for selective content sharing that supports application-level privacy. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope.

At block 402, initiating application-level privacy is performed. For example, application-level privacy is implemented either through an application privacy setting or through a privacy seeking application.

For application-level privacy setting, a user interaction initiates the running of the application privacy setting in a computing device (e.g., computing device 102-2). On the other hand, the privacy seeking application requires no user interaction during initiation since the privacy seeking application is configured to run by itself when a system is turned ON. In other implementations, the privacy seeking application may be cloud based such that, the user may log in and register the computing devices that may include the selective content sharing features. Upon connection of the registered computing devices to the cloud, these computing devices may initiate right away the application-level privacy as described above.

At block 404, loading at least one application is performed. For example, when utilizing the application privacy setting, the application (e.g., application 302) in a manifest file (e.g., manifest file 200) is loaded for selective content sharing. In another example such as when utilizing the privacy seeking application, the loading of the application may occur when the system for the computing device 102 is turned ON.

In an implementation, the loading of the application includes loading of newly invoked applications or loading of the application or applications that are currently running in the system. For example, an incoming call (e.g., incoming call 110) is a newly invoked application that may be loaded in the manifest file 200.

At block 406, configuring the at least one application as a sensitive application or non-sensitive application. For example, the sensitive application includes the application 302 that is configured for private consumption in a local display (e.g., local display 104-2). In other words, when utilizing the application privacy setting, the sensitive application includes the application with an enabled private policy setting. On the other hand, the non-sensitive application includes the application 302 that is configured and selected for content sharing in a rendering computing device (e.g., computing device 102-4). For example, when utilizing the application privacy setting, the non-sensitive application includes the application with a disabled private policy setting (e.g., check tags 210-6 and 210-8).

In the instances where the privacy seeking application is utilized, the applications 302 are pre-configured to be either a sensitive application or a non-sensitive application. In other words, the privacy seeking application pre-configures the enabling or disabling of the private policy setting for the application 302.

At block 408, storing the sensitive application and the non-sensitive application in separate buffers and memories. For example, the sensitive application (e.g., enabled private policy tag) is communicated to a hardware overlay (e.g., hardware overlay 308) that is separate and independent from a frame buffer (e.g., frame buffer 310) that is utilized for the non-sensitive application (e.g., disabled private policy tag).

At block 410, rendering the sensitive and non-sensitive applications in a local display and a remote display, respectively. For example, the sensitive application that is rendered in the local display cannot be captured or shared with the remote display. In other words, any newly invoked application or any new application that will be running in the local display will not be rendered in the remote display unless otherwise the newly invoked application or new application is configured to be a non-sensitive application by following the procedures discussed above.

Realizations in accordance with the present concepts have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope as defined in the claims that follow.

Figure 5:
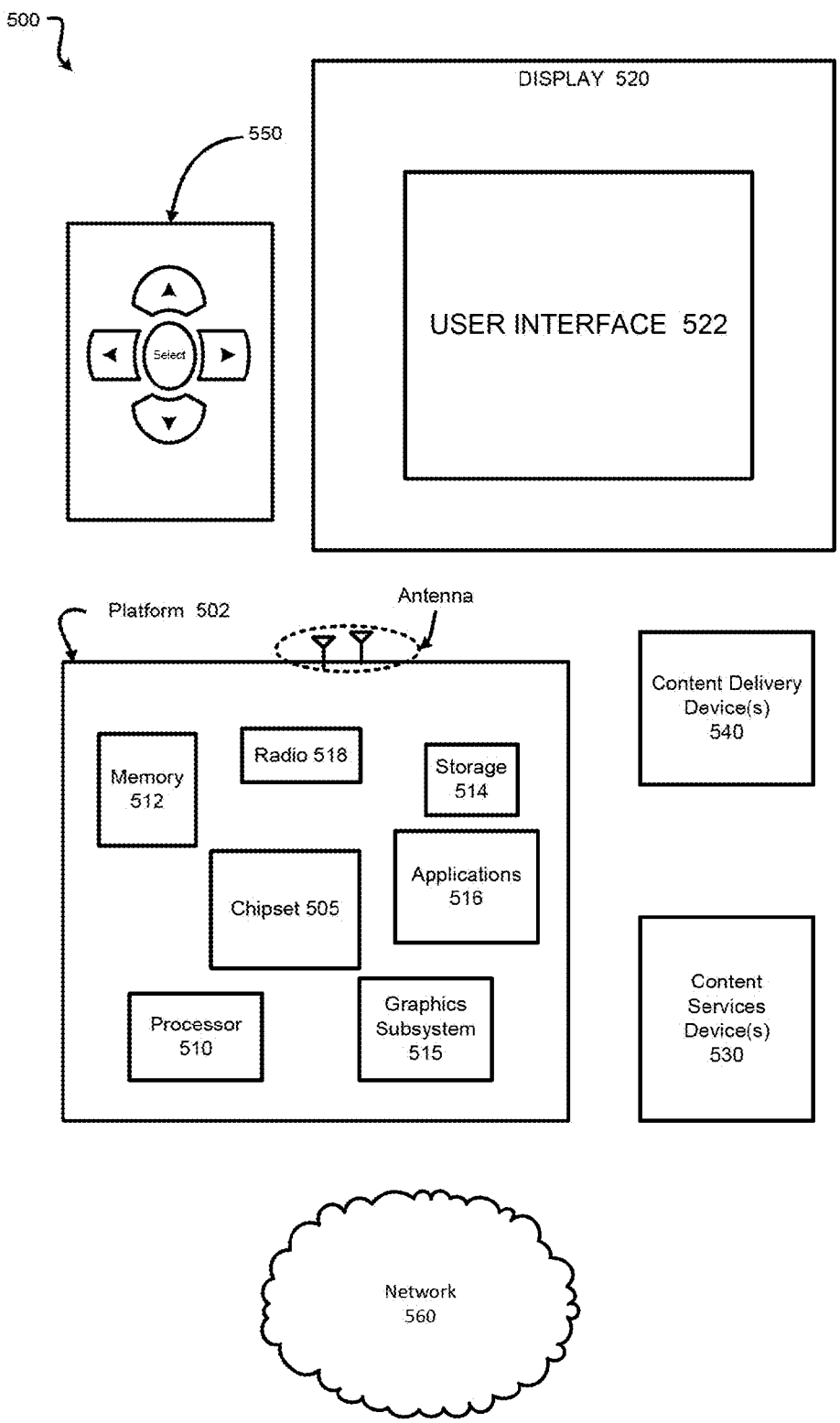
FIG. 5 illustrates an example system device to implement selective content sharing feature in a computing device.

FIG. 5 illustrates an example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

As described above, system 500 may be embodied in varying physical styles or form factors. FIG. 5 illustrates implementations of a small form factor device 500 in which system 500 may be embodied. In embodiments, for example, device 500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 6:
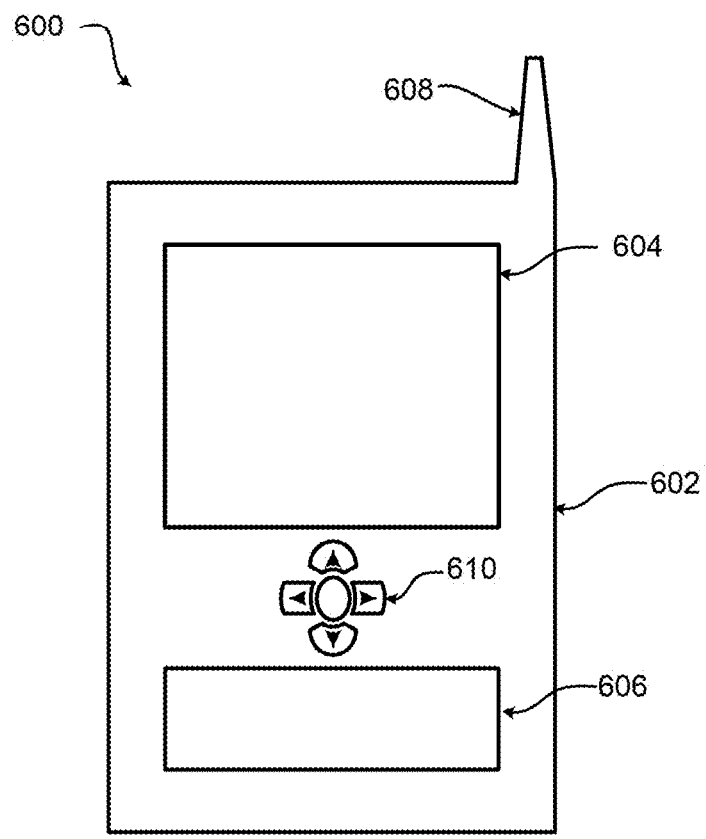
FIG. 6 illustrates an example device to implement selective content sharing feature in a computing device.

As shown in FIG. 6, device 600 may include a housing 602, a display 604, an input/output (I/O) device 606, and an antenna 608. Device 600 also may include navigation features 610. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In an embodiment a device comprises one or more processors configured to load and classify at least one application as a sensitive application or a non-sensitive application; a memory coupled to the one or more processors, the memory configured to separately store the sensitive application from the non-sensitive application; and a rendering system coupled to the memory, configured to receive the sensitive and non-sensitive applications, to determine a resulting composed frame for the sensitive and non-sensitive applications, and to determine a corresponding target display to render the resulting composed frame.

The device may include at least one application includes an application running or an invoked application on the device.

The device may include the resulting frame include a composite frames for sensitive and non-sensitive applications.

The device may have the sensitive applications include the at least one application that is configured to include an enabled private policy setting.

The device may have a user configures the private policy setting.

The device may have policy setting is configured per user and/or per device.

The device may have policy setting is configured by a cloud based support across multiple devices.

The device may have the sensitive application includes the application that is rendered in a local display; the sensitive application is not captured or shared to the corresponding target display.

The device may have the rendering system is configured to communicate the resulting composed frame to a graphics system for rendering to the corresponding target display.

The device may have further comprise a hardware overlay buffer configured to receive sensitive application that is rendered in a local display.

The device may have further comprise a frame buffer configured to receive non-sensitive application that is rendered in a local display, the corresponding target display, and/or both the local display and the corresponding target display.

In an embodiment, a method comprises initiating an application-level privacy, the application-level privacy includes selective content sharing of at least one application; loading the least one application; in response to the loaded at least one application: configuring the at least one application as a sensitive application or a non-sensitive application; storing sensitive and non-sensitive applications in separate memories; rendering the stored sensitive and non-sensitive applications in separate displays.

The method may have the initiating the application-level privacy includes opening an application privacy setting or running a privacy seeking application, the application privacy setting utilizes a user interaction while the privacy seeking application is pre-programmed to implement the selective content sharing.

The method may have the loading of the at least one application includes loading of the applications that are currently running or newly invoked applications.

The method may have the configuring of the at least one application, when utilizing an application privacy setting, includes determining the at least one application with enabled private policy setting, wherein the configuring of the at least one application, when utilizing a privacy seeking application, includes a pre-configured enabling or disabling of the private policy setting of the at least one application.

The method may have the rendering of the stored sensitive application utilizes a hardware overlay buffer that is separate and independent from a frame buffer that is utilized when rendering the stored non-sensitive application.

The method may have the rendering of the sensitive application utilizes a local display; the rendering in the local display is not captured or shared in a remote display.

The method may have the rendering of the non-sensitive application utilizes a local display or a remote display and/or both the local display and the remote display; wherein the remote display is connected through a wired or wireless link.

In an embodiment, computer-readable media with processor-executable instructions stored thereon which when executed by one or more processors cause performance of operations comprising: initiating an application privacy setting, the application privacy setting includes selective content sharing of at least one application; loading the at least one application; in response to the loading the at least one application: configuring the at least one application as a sensitive application or as a non-sensitive application; storing sensitive and non-sensitive applications in separate memories; rendering the stored sensitive and non-sensitive applications in separate displays.

The computer-readable media may have the initiating the application privacy setting includes opening the application privacy setting through a user interaction.

The computer-readable media may have the loading of the at least one application includes loading of the applications that are currently running or newly invoked applications.

The computer-readable media may have the rendering of the stored sensitive application utilizes a hardware overlay buffer that is separate and independent from a frame buffer that is utilized when rendering the stored non-sensitive application.

The computer-readable media may have the rendering of the sensitive application utilizes a local display; the rendering in the local display is not captured or shared in a remote display.

What is claimed is:

1. A device comprising:
a hardware overlay buffer configured to receive sensitive application that is rendered in a local display;
one or more processors configured to load and classify at least one application as a sensitive application or a non-sensitive application;
a memory coupled to the one or more processors, the memory configured to separately store the sensitive application from the non-sensitive application;
a rendering system coupled to the memory, configured to receive the sensitive and non-sensitive applications, to determine a resulting composed frame for the sensitive and non-sensitive applications, and to determine a corresponding target display to render the resulting composed frame;

and a privacy seeking application configured to detect and utilize a type of link connection based on whether the at least one application is a sensitive application or a non-sensitive application, wherein the sensitive application includes the application that is rendered in a local display, the sensitive application is not captured or shared to the corresponding target display.

2. The device as recited in claim 1, wherein the at least one application includes an application running or an invoked application on the device.

3. The device as recited in claim 1, wherein the resulting frame includes composite frames for sensitive and non-sensitive applications.

4. The device as recited in claim 1, wherein sensitive applications include the at least one application that is configured to include an enabled private policy setting.

5. The device of claim 4, wherein a user configures the private policy setting.

6. The device of claim 4, wherein policy setting is configured per user and/or per device.

7. The device of claim 4, wherein policy setting is configured by a cloud based support across multiple devices.

8. The device as recited in claim 1, wherein the rendering system is configured to communicate the resulting composed frame to a graphics system for rendering to the corresponding target display.

9. The device as recited in claim 1 further comprising a frame buffer configured to receive non-sensitive application that is rendered in a local display, the corresponding target display, and/or both the local display and the corresponding target display.

10. A method comprising: initiating an application-level privacy, the application-level privacy includes selective content sharing of at least one application;

loading the least one application;

in response to the loaded at least one application: configuring the at least one application as a sensitive application or a non-sensitive application, wherein a hardware overlay buffer receives the sensitive application that is rendered in a local display, storing sensitive and non-sensitive applications in separate memories;

detecting and utilizing a type of link connection based on whether the at least one application is a sensitive application or a non-sensitive application;

and rendering the stored sensitive and non-sensitive applications in separate displays, wherein the sensitive application includes the application that is rendered in the local display, the sensitive application is not captured or shared to the corresponding target display.

11. The method of claim 10, wherein the initiating the application-level privacy includes opening an application privacy setting or running a privacy seeking application, the application privacy setting utilizes a user interaction while the privacy seeking application is pre-programmed to implement the selective content sharing.

12. The method of claim 10, wherein loading of the at least one application includes loading of the applications that are currently running or newly invoked applications.

13. The method of claim 10, wherein the configuring of the at least one application, when utilizing an application privacy setting, includes determining the at least one application with enabled private policy setting, wherein the configuring of the at least one application, when utilizing a privacy seeking application, includes a pre-configured enabling or disabling of the private policy setting of the at least one application.

14. The method of claim 10, wherein the rendering of the stored sensitive application utilizes a hardware overlay buffer that is separate and independent from a frame buffer that is utilized when rendering the stored non-sensitive application.

15. The method of claim 10, wherein the rendering of the sensitive application utilizes a local display, the rendering in the local display is not captured or shared in a remote display.

16. The method of claim 10, wherein the rendering of the non-sensitive application utilizes a local display or a remote display and/or both the local display and the remote display; wherein the remote display is connected through a wired or wireless link.

17. Non-transitory computer-readable media with processor-executable instructions stored thereon which when executed by one or more processors cause performance of operations comprising:

initiating an application privacy setting, the application privacy setting includes selective content sharing of at least one application;

loading the at least one application;

in response to the loading the at least one application: configuring the at least one application as a sensitive application or as a non-sensitive application, wherein a hardware overlay buffer receives the sensitive application that is rendered in a local display;

storing sensitive and non-sensitive applications in separate memories;

detecting and utilizing a type of link connection based on whether the at least one application is a sensitive application or a non-sensitive application;

and rendering the stored sensitive and non-sensitive applications in separate display, wherein the sensitive application includes the application that is rendered in the local display, the sensitive application is not captured or shared to the corresponding target display.

18. The non-transitory computer-readable media in claim 17, wherein the initiating the application privacy setting includes opening the application privacy setting through a user interaction.

19. The non-transitory computer-readable media in claim 17, wherein loading of the at least one application includes loading of the applications that are currently running or newly invoked applications.

20. The non-transitory computer-readable media in claim 17, wherein the rendering of the stored sensitive application utilizes a hardware overlay buffer that is separate and independent from a frame buffer that is utilized when rendering the stored non-sensitive application.

21. The non-transitory computer-readable media in claim 17, wherein the rendering of the sensitive application utilizes a local display, the rendering in the local display is not captured or shared in a remote display.

* * * * *